United States Patent [19]
Takebayashi

[11] Patent Number: 5,055,866
[45] Date of Patent: Oct. 8, 1991

[54] RETRACTABLE ZOOM-STROBE DEVICE

[75] Inventor: Tatsuhide Takebayashi, Tokyo, Japan

[73] Assignee: Asahi Kogaku Kogyo Kabushiki Kaisha, Tokyo, Japan

[21] Appl. No.: 550,022

[22] Filed: Jul. 9, 1990

[30] Foreign Application Priority Data

Jul. 11, 1989 [JP] Japan .................. 1-178270

[51] Int. Cl.$^5$ ............................. G03B 15/05
[52] U.S. Cl. .................. 354/149.1; 354/149.11
[58] Field of Search ............ 354/149.1, 149.11

[56] References Cited

U.S. PATENT DOCUMENTS

| | | | |
|---|---|---|---|
| 4,462,666 | 7/1984 | Orban | 354/126 |
| 4,472,042 | 9/1984 | Iwata et al. | 354/418 |
| 4,847,647 | 7/1989 | Ueda | 354/149.1 |
| 4,910,542 | 3/1990 | Yamamoto et al. | 354/149.1 |
| 4,970,539 | 11/1990 | Sasagaki et al. | 354/149.1 |
| 4,982,210 | 1/1991 | Shimada et al. | 354/149.1 |

OTHER PUBLICATIONS

United Kingdom Search Report, Application No. 9015166.3, searched Oct. 17, 1990.

Primary Examiner—Michael L. Gellner
Attorney, Agent, or Firm—Sandler, Greenblum, & Bernstein

[57] ABSTRACT

A retractable zoom-strobe device including a strobe housing, which is movable between a retracted position and a projected position, and a movable illuminating angle varying member, which is movably supported by the strobe housing, are provided. A powered strobe light emitter moving mechanism includes a strobe gear train, the gears of which are fixably mounted with respect to one another. The strobe gear train engages a swing arm, to which the strobe housing is attached, to move the strobe housing between the retracted position and the projected position. A powered illuminating angle varying member is also provided, which includes a zoom gear train which has a rack that moves the light emitting unit. Both the zoom gear train and the strobe gear train are powered by a single drive motor.

21 Claims, 5 Drawing Sheets

RETRACTABLE ZOOM-STROBE DEVICE

BACKGROUND OF THE INVENTION

1. Field of the Invention

The present invention relates to a retractable zoom-strobe device in which a light emitter is movable between a retracted position and a projected position and in which the illuminating angle of light emitted from the light emitter is variable.

2. Description of the Related Art

A retractable type of zoom-strobe device is incorporated, for example, in a single-lens reflex camera. A zoom-strobe device in which an illuminating angle is variable is also known. A powered strobe device in which the retraction of the light emitter or the variation of the illuminating angle is automatically and electrically effected is also known. However, there is no retractable type of zoom-strobe device. retractable type of zoom-strobe device.

SUMMARY OF THE INVENTION

The primary object of the present invention is to provide a retractable zoom-strobe device.

Another object of the present invention is to provide a retractable zoom-strobe device having a single drive source.

To achieve the object mentioned above, according to one aspect of the present invention, there is provided a retractable zoom-strobe device including a strobe light emitter which is movable between a retracted position and a projected position by a motor drive and which has a movable illuminating angle varying member. A strobe gear train which moves the strobe light emitter between the retracted position and the projected position is provided and is connected to a zoom gear train which varies the position of the illuminating angle varying member. The device comprises an idling mechanism which is provided at the connection of the strobe gear train and the zoom gear train to transmit the drive to the zoom gear train only after the strobe light emitter is brought into the projected position.

With this arrangement, both the retraction operation of the strobe light emitter and the varying operation of the illuminating angle (i.e. the zooming operation) can be effected by a single drive source (motor).

BRIEF DESCRIPTION OF THE DRAWINGS

The invention will be described below in detail with reference to the accompanying drawings, in which.

DESCRIPTION OF THE PREFERRED EMBODIMENTS

Figure 1:
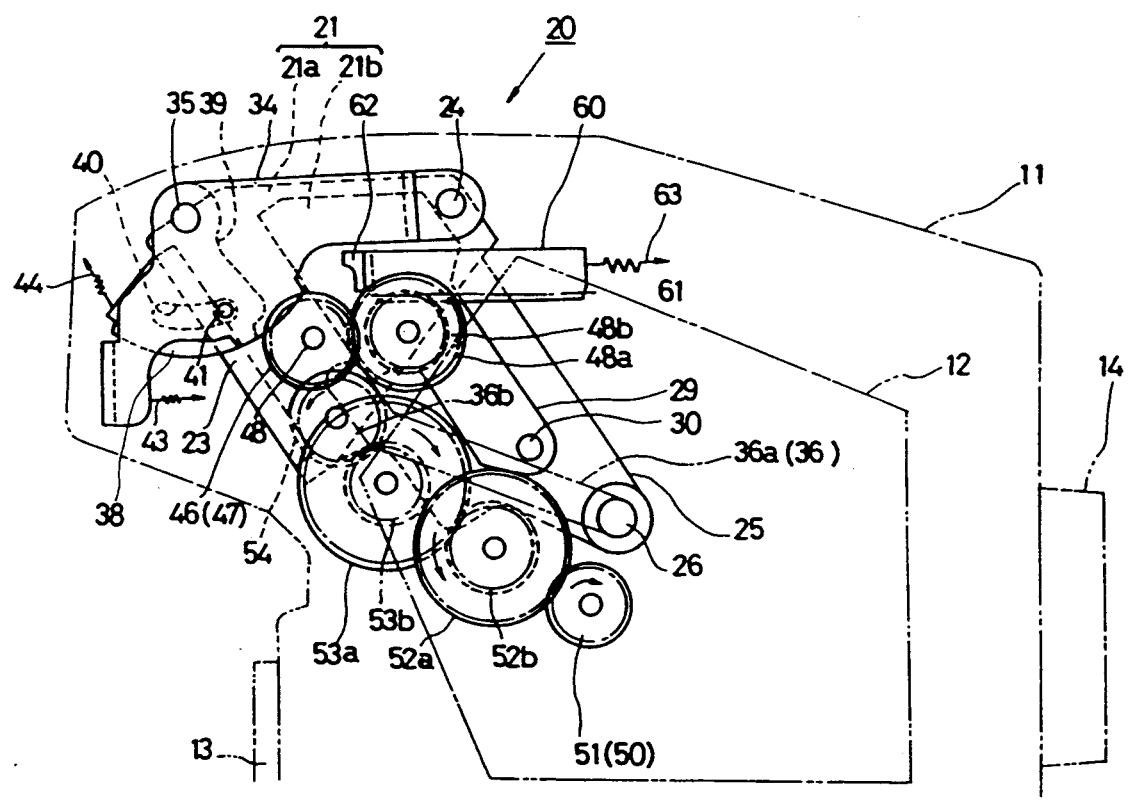
FIG. 1 is a side elevational view of a retractable zoom-strobe device according to the present invention.

The illustrated embodiment is applied to a single-lens reflex camera in which the retractable zoom-strobe device of the invention is incorporated.

A camera body 11 has therein a pentagonal prism 12 known per se. A retractable zoom-strobe device 20 of the invention is provided above and in front of the pentagonal prism 12. The camera body 11 is provided on its front portion with a lens mount 13 to which a lens is detachably mounted. An eye-piece 14 is provided on the camera body 11 at the rear of the pentagonal prism 12.

Figure 2A:
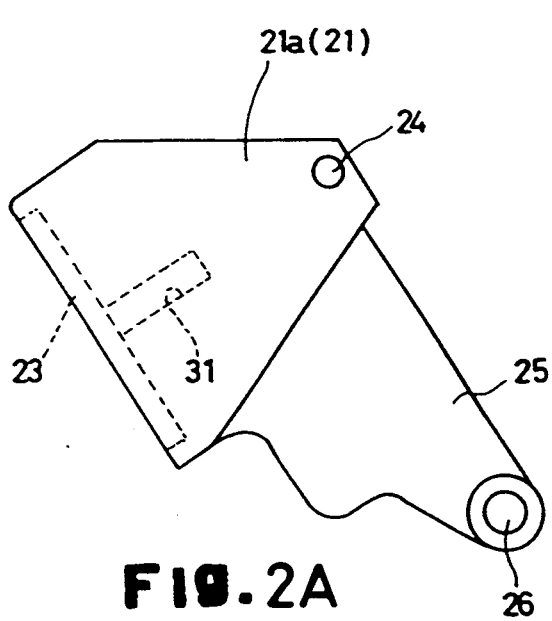
FIGS. 2A and 2B are side elevational views of a strobe housing and a light emitter, both constituting a strobe light emitter, respectively.
Figure 2B:
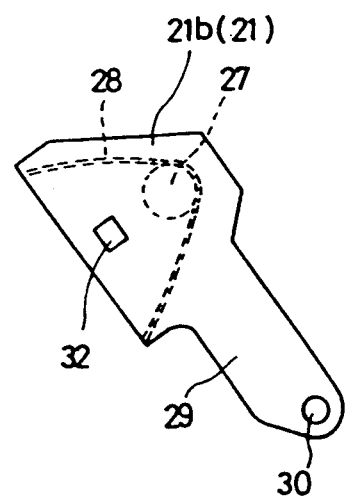

The retractable zoom-strobe device 20 has a strobe light emitter 21 which has a strobe housing 21a as shown in FIG. 2A and a light emitting unit 21b as shown in FIG. 2B. The strobe light emitter 21 has a Fresnel lens 23 on the front face thereof and a pivot pin 24 on the rear side portion of the strobe light emitter 21. The strobe light emitter 21 has a leg portion 25 which extends downwardly and which is provided on its lower (front) end with a posture control pin 26. The light emitting unit 21b has a light emitting tube 27 and a reflection shade 28. A downward extending leg 29 of the light emitting unit 21b which has thereon a position control pin 30.

The strobe housing 21a and the light emitting unit 21b have an elongated groove 31 and an angular projection 32 which is fitted in the elongated groove 31, respectively, so that the light emitting unit 21b can be moved in the optical axis direction of the Fresnel lens 23 (strobe housing 21a) without being inclined, in accordance with the elongated groove 31 and the angular projection 32, to change the illuminating angle of the strobe. Namely, in the illustrated embodiment, the light emitting unit 21b constitutes an illuminating angle varying member. The light emitting unit 21b is continuously biased by a tensile spring 33 shown in FIG. 3B to move away from the Fresnel lens 23, i.e. in a direction in which the illuminating angle is reduced.

The pivot pin 24 of the strobe light emitter 21 is pivoted to a free end of a swing arm 34 which is pivoted to the camera body 11 through an immovable shaft 35. The posture control pin 26 is fitted in a cam groove 36 formed in the camera body 11. The cam groove 36 has a linear portion 36a and an arched portion 36b, so that when the swing arm 34 rotates about the axis of the immovable shaft 35, the strobe light emitter 21 moves between the retracted position shown in FIG. 1 and the projected position shown in FIGS. 3A and 3B, in accordance with the cam groove 36.

The arched portion 36b has an arched profile defined by a part of a circle having a center c and a radius identical to the length of a line b which extends in parallel with a line a connecting the immovable shaft 35 and the pivot pin 24 in the projected position of the strobe light emitter 21. One end of the line b is located at the center c and the other end thereof is located at the posture control pin 26. With this arrangement, the strobe light emitter 21 moves in a parallel motion when the posture control pin 26 is in the arched portion 36b, so that the optical axis of the strobe light emitter 21 (and accordingly, the Fresnel lens 23) moves up and down without being inclined.

The swing arm 34 has a sector gear 38 formed thereon. The immovable shaft 35 has an idling sector gear 39 coaxial and pivoted thereto. The idling sector gear 39 has an arched groove 40 in which an association pin 41 formed on the swing arm 34 is fitted, so that the swing arm 34 and the idling sector gear 39 are movable relative to each other within limits defined by the arched groove 40. The swing arm 34 and the idling sector gear 39 are biased in the opposite directions by respective tensile springs 43 and 44, as shown in FIG. 1, so that the association pin 41 is normally in contact with one end (right end in FIG. 1) of the arched groove 40.

Figure 4:
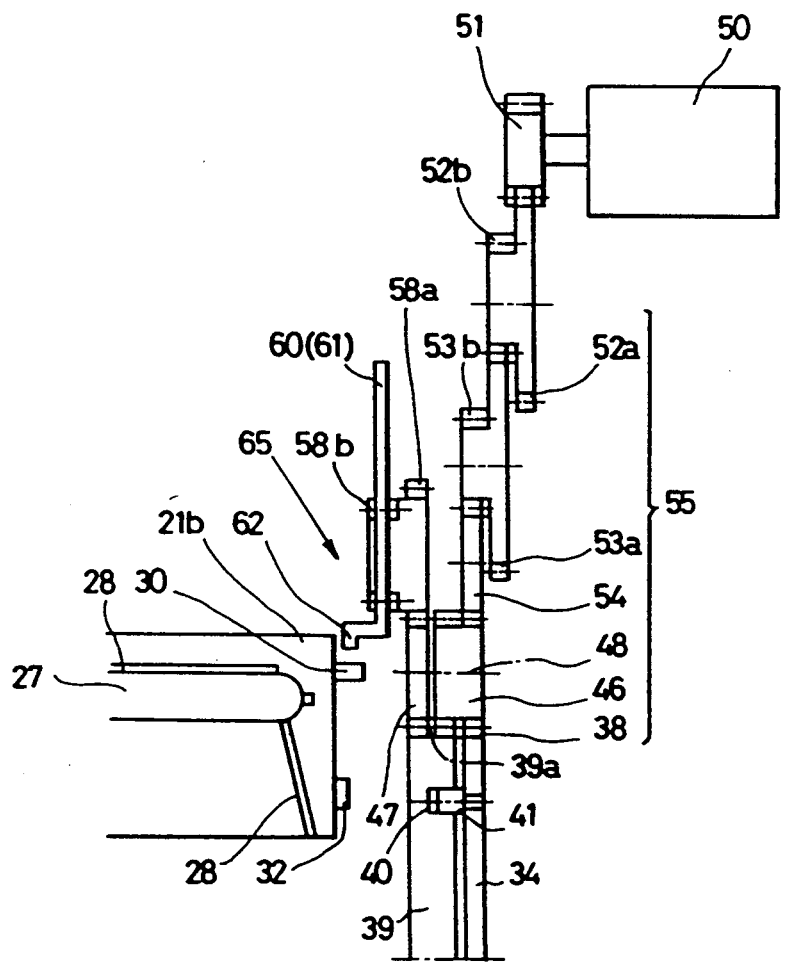
FIG. 4 is a plan view of a drive system of a retractable zoom-strobe device according to the present invention.

The sector gear 38 of the swing arm 34 and a gear 39a of the idling sector gear 39 are simultaneously in mesh with a gear 46. The gear 39a is in mesh with a gear 47 which is rotatable relative to the gear 46 and which has a shaft 48 common to the gear 46, as shown in FIG. 4.

A pinion 51 of a drive motor 50 is connected to the gear 46 through gears 52a, 52b, 53a, 53b and 54. These gears constitute a strobe gear train 55.

The gear 47 is in mesh with a gear 58a which is coaxial to a gear 58b integral therewith which is engaged by a rack 61 formed on a zoom member 60. The zoom member 60 is supported to move forwardly and rearwardly, so that when the strobe light emitter 21 is in the projected position, a front pusher 62 of the zoom member 60 presses the position control pin 30 of the light emitting unit 21b to adjust the position of the latter. The zoom member 60 is continuously biased rearwardly by a tensile spring 63, as shown in FIG. 1. The idling sector gear 39, the gears 58a, 58b and the rack 61 constitute a zoom gear train 65.

The retractable zoom-strobe device 20 as constructed above operates as follows.

Figure 6:
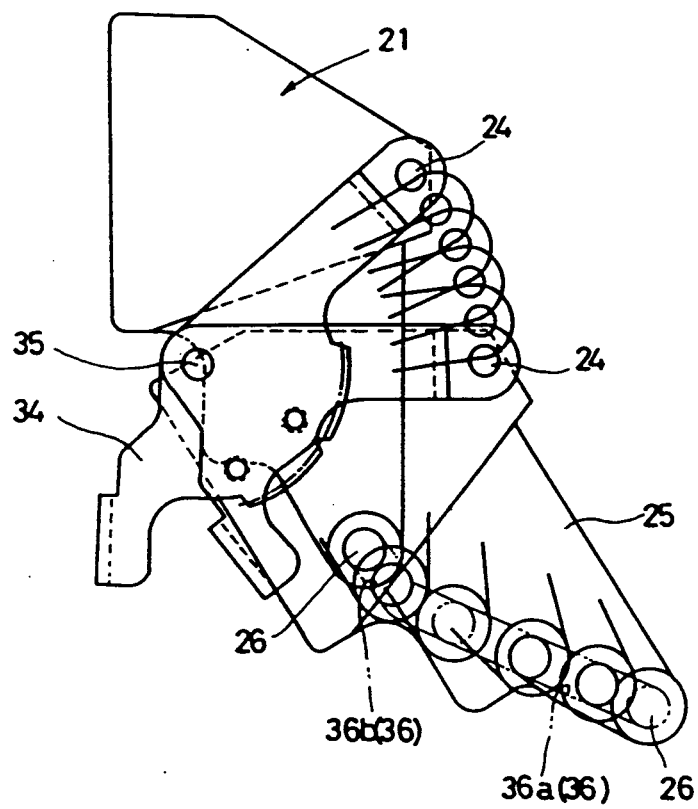

In the retracted position shown in FIG. 1, when the pinion 51 of the drive motor 50 is rotated in the clockwise direction, the gear 46 is rotated in the same direction through the strobe gear train 55. As a result, the swing arm 34 having the sector gear 38 which is engaged by the gear 46 is rotated about the immovable shaft 35 in the counterclockwise direction, so that the strobe light emitter 21 is moved to the projected position. FIG. 6 shows the movement of the pivot pin 24 and the posture control pin 26 from the retracted position to the projected position.

Figure 3A:
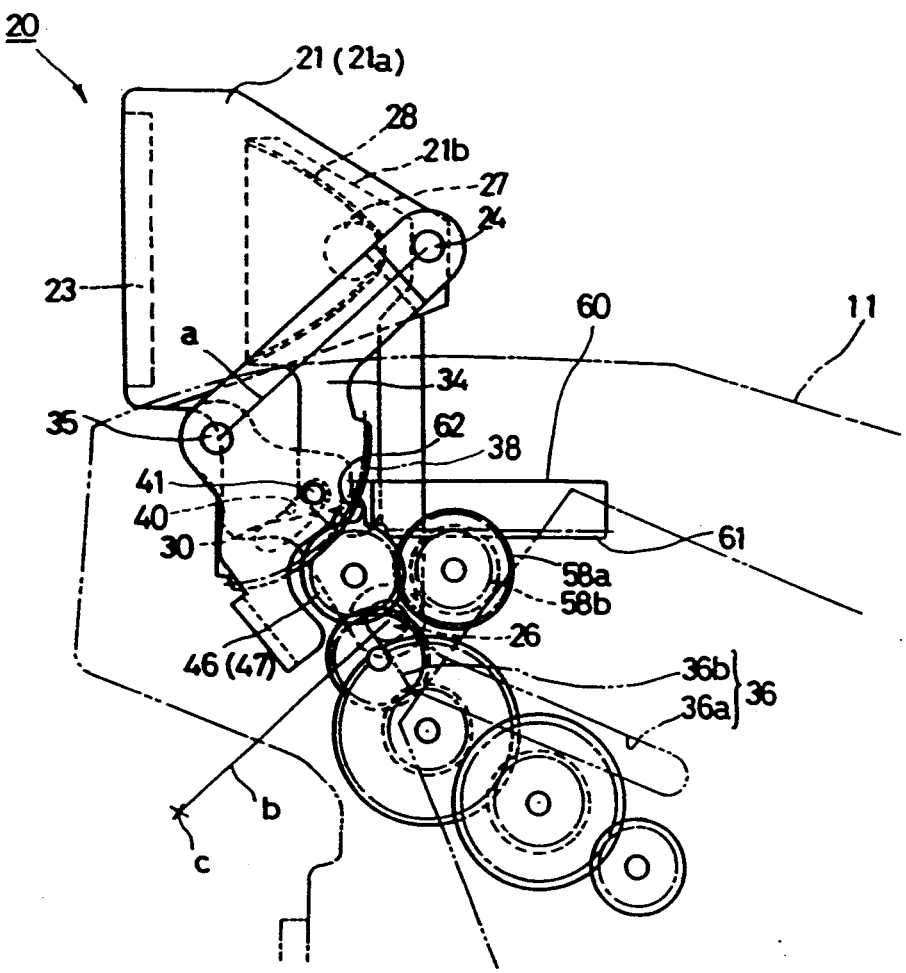
FIGS. 3A and 3B are side elevational views of a strobe light emitter in a projected position at different illuminating angles.

Upon movement of the strobe light emitter 21, the rotation of the gear 46 is transmitted to the idling sector gear 39 through the gear 39a, so that the gear 47 rotates together with the gear 46. As a result, the zoom member 60 is advanced through the zoom gear train 65 (gears 58a, 58b and the rack 61). The diameters and the number of teeth of the gears are determined, so that the pusher 62 of the zoom member 60 engages with the position control pin 30 of the light emitting unit 21b at the forward position of the zoom member 60 during the movement of the strobe light emitter to the projected position. This is shown in FIG. 3A in which the light emitting unit 21b is located at a rear end (retracted end). In this state, if the light emitting tube 27 is made ON (lightened), the illuminating angle of light emitted through the Fresnel lens 23 becomes smallest (narrowest), which is suitable for a telephoto lens.

Figure 5A:
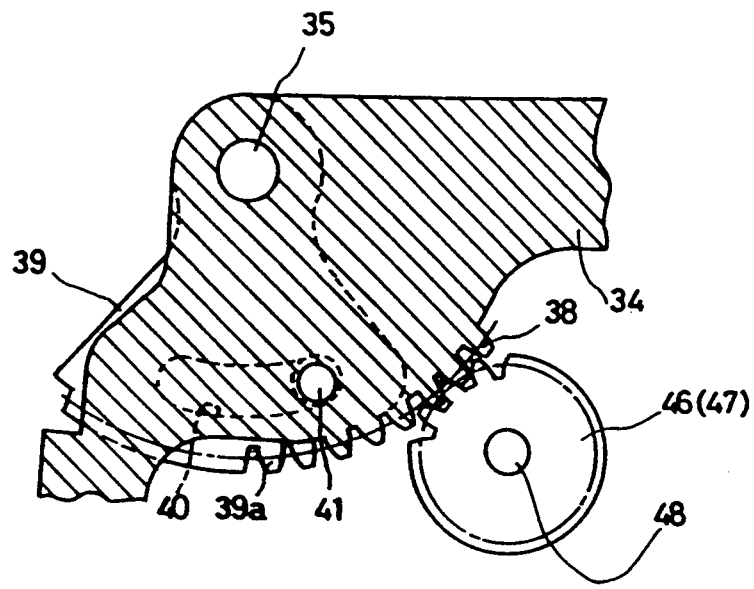
FIGS. 5A and 5B are side elevational views of a strobe light emitter when the latter is moved up and down and when the illuminating angle is varied, respectively; and, FIG. 6 is a side elevational view of a strobe light emitter as it is moved from a retracted position to a projected position.
Figure 5B:
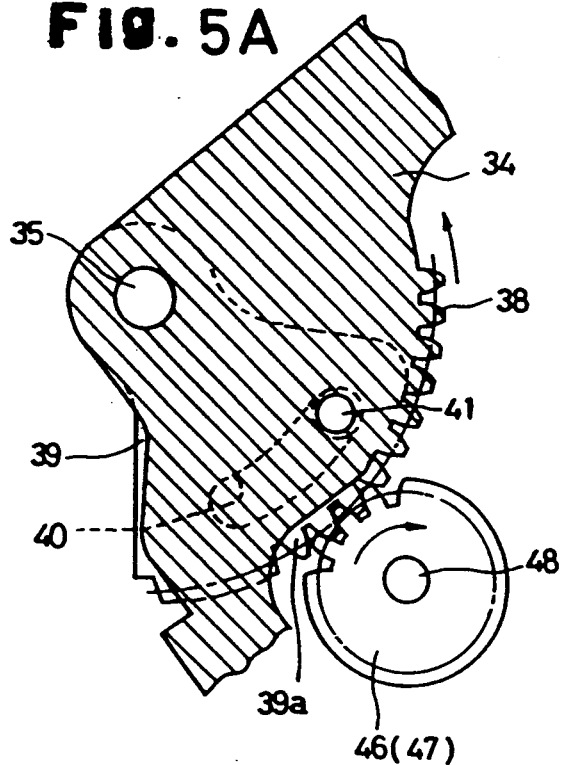

In the projected position of the strobe light emitter 21, the gear 38 of the swing arm 34 is disengaged from the gear 46, as shown in FIG. 5B. The tensile, spring 43 rotates the swing arm 34 in a direction of the disengagement.

To increase the illuminating angle, the pinion 51 is rotated further in the clockwise direction by the drive motor 50. As a result, the idling sector gear 39 rotates (idles) relative to the swing arm 34 through the gear 39a which is in mesh with the gear 46. Namely, the drive force of the strobe gear train 55 is transmitted only to the zoom gear train 65 and not to the swing arm 34. Consequently, the zoom member 60 is advanced through the gears 47, 58a, 58b and the rack 61, so that the pusher 62 of the zoom member 60 pushes the position control pin 30 of the light emitting unit 21b. As a result, the light emitting unit 21b is advanced to increase the illuminating angle of the strobe light emitter 21 (FIG. 3B).

The value of the illuminating angle depends on the forward displacement of the light emitting unit 21b, that is, the distance of the light emitting tube 27 and the reflecting shade 28 from the Fresnel lens 23. Therefore, in order to obtain a strobe illuminating angle appropriate to the photographing lens, it is possible to provide a position detecting means on the zoom member 60, so that the detection signal thereof is transmitted to the camera body 11 to control the drive motor 50. Alternatively, it is also possible to control the angular displacement of the drive motor 50 in accordance with the focal length data of the photographing lens. The focal length data is usually stored in a lens ROM of an existing AF interchangeable lens.

Figure 3B:
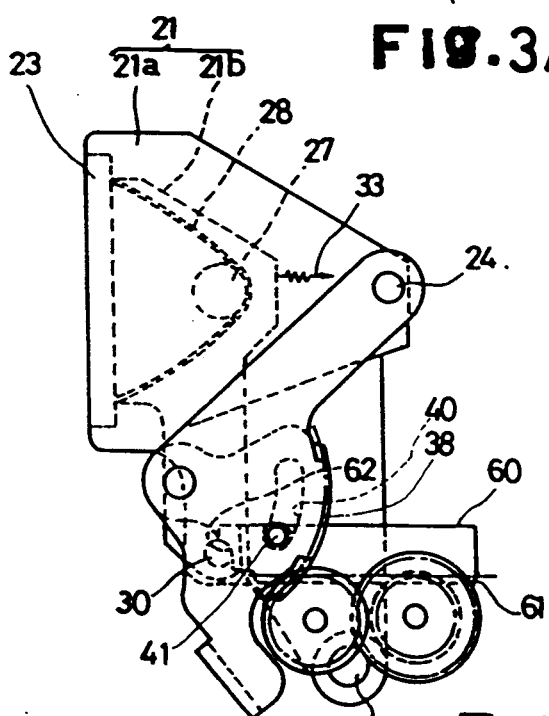

Upon retracting the strobe light emitter 21, the pinion 51 is rotated in the counterclockwise direction through the drive motor 50 in FIGS. 3A, 3B and 5B. As a result, the zoom member 60 is retracted, contrary to the operations mentioned above. Thereafter, when one end of the arched groove 40 is engaged by the association pin 41 during the rotation of the idling sector gear 39, the idling sector gear 39 and the swing arm 34 rotate together in the clockwise direction, so that the sector gear 38 comes into engagement with the gear 46. As a result, the swing arm 34 rotates in the clockwise direction to retract the strobe light emitter 21, as shown in FIG. 1.

In the illustrated embodiment, the arched groove 40 and the association pin 41 are used to idle the swing arm 34 and the idling sector gear 39. Alternatively, it is possible to provide a frictional clutch device between the swing arm 34 and the idling sector gear 39 to idle the swing arm 34 and the idling sector gear 39.

As can be seen from the foregoing, according to the present invention, the movement of the strobe light emitter between the retracted position and the projected position and the zooming operation for varying the illuminating angle by the movement of the illuminating angle varying member of the strobe light emitter can be effected by a single drive source. Thus, a highly powered small retractable zoom-strobe device can be realized.

I claim:

1. A retractable zoom-strobe device comprising:
a strobe housing which is movable between a retracted position and a projected position;
a movable illuminating angle varying member which is movably supported by said strobe housing;
a powered strobe light emitter moving mechanism which moves said strobe housing between the retracted position and the projected position, wherein said powered light emitter moving mechanism comprises a strobe gear train for rotating said strobe housing, wherein at least two gears of said strobe gear train nearest said strobe light emitter are mounted to rotate about axes which are fixed with respect to said gear train; and a powered illuminating angle varying member moving mechanism which moves said illuminating angle varying member.

2. A retractable zoom-strobe device according to claim 1, further comprising a single drive source which drives both said powered strobe light emitter moving mechanism and said powered illuminating angle varying member moving mechanism.

3. A retractable zoom-strobe device according to claim 2, wherein said strobe housing has a strobe light emitter.

4. A retractable zoom-strobe device according to claim 3, wherein said powered illuminating angle varying member moving mechanism is actuated after said light emitter is moved to the projected position by said powered strobe light emitter moving mechanism.

5. A retractable zoom-strobe device according to claim 1, further comprising a swing arm which is rotatable about an immovable shaft and which has a free end to which said strobe housing is pivoted.

6. A retractable zoom-strobe device according to claim 5, wherein said strobe housing has a Fresnel lens supported thereon.

7. A retractable zoom-strobe device according to claim 6, wherein said illuminating angle varying member comprises a light emitting unit which is movable in the optical axis direction of the Fresnel lens.

8. A retractable zoom-strobe device according to claim 7, wherein said strobe housing has one of a pin or cam which is engaged by one of a stationary cam or pin to control the posture of the strobe housing.

9. A retractable zoom-strobe device according to claim 7, further comprising a drive motor and wherein said strobe gear train is adapted for rotating said strobe housing in accordance with the rotation of said drive motor.

10. A retractable zoom-strobe device according to claim 9, further comprising a zoom member for moving the light emitting unit.

11. A retractable zoom-strobe device according to claim 10, wherein said powered illuminating angle varying member moving mechanism comprises a zoom gear train for driving said zoom member in accordance with the rotation of said drive motor.

12. A retractable zoom-strobe device according to claim 11, wherein said strobe gear train is driven by said drive motor and wherein said zoom gear train is connected to said strobe gear train.

13. A retractable zoom-strobe device according to claim 12, further comprising an idling means at the connection of said strobe gear train and said zoom gear train for transmitting the drive force of said drive motor only to the zoom gear train after the strobe light emitter is brought into the projected position.

14. A retractable zoom-strobe device according to claim 13, wherein said idling means comprises an arched groove provided on said swing arm and which has a center located at the center of rotation of said swing arm, a pin which is provided on a first gear comprising part of said zoom gear train to coaxially rotate relative to said swing arm and which is fitted in said arched groove, and a second gear comprising part of the zoom gear train and in mesh with said first gear comprising part of said zoom gear train, and said first gear is provided on said swing arm.

15. A retractable zoom-strobe device according to claim 14, wherein said light emitting unit is biased in the optical axis direction, so that said zoom member moves said light emitting unit against the biasing force.

16. A retractable zoom-strobe device according to claim 15, wherein the displacement of said zoom member is determined in accordance with the focal length data of the photographing lens.

17. A retractable zoom-strobe device comprising;
a strobe light emitter which is moved between a retracted position and a projected position by a drive motor; and
a movable illuminating angle varying member which is supported by said strobe light emitter; wherein
the device comprises a strobe gear train for moving said strobe light emitter between the retracted position and the projected position,
a zoom gear train which is connected to said strobe gear train to change the position of the illuminating angle varying member, wherein said zoom gear train includes a translatable rack engageable with said illuminating angle varying member to change the position of said illuminating angle varying member, and
idling means at the connection of said strobe gear train and said zoom gear train for transmitting the drive force of said drive motor only to said zoom gear train after said strobe light emitter is moved into the projected position.

18. A retractable zoom-strobe device comprising;
a drive motor;
a stobe gear train rotated by said drive motor;
a strobe light emitter which is moved between a retracted position and a projected position by the rotation of said drive motor through said strobe gear train at least two gears of said strobe gear train nearest said strobe light emitter are mounted for rotation about axes which are fixed with respect to said gear train;
a movable illuminating angle varying member which is provided on said strobe light emitter; and
a zoom gear train which moves said illuminating angle varying member through said zoom gear train after said strobe light emitter is moved to the projected position by said strobe gear train.

19. A retractable zoom-strobe device according to claim 1, further including a translatable rack which engages said illuminating angle varying member to change the position of said illuminating angle varying member.

20. A retractable zoom-strobe device according to claim 17, wherein at least two gears of said strobe gear train nearest said strobe light emitter are mounted for rotation about axes which are fixed with respect to said gear train.

21. A retractable zoom-strobe device according to claim 18, wherein said zoom gear train includes a translatable rack engageable with said illuminating angle varying member to change the position of said illuminating angle varying member.

* * * * *